(12) United States Patent
Rapp

(10) Patent No.: US 7,221,638 B2
(45) Date of Patent: May 22, 2007

(54) ELECTRONIC CIRCUIT FOR DECODING A READ SIGNAL FROM AN OPTICAL STORAGE MEDIUM

(75) Inventor: Stefan Rapp, Schramberg (DE)

(73) Assignee: Thomson Licensing, Boulogne-Billancourt (FR)

( * ) Notice: Subject to any disclaimer, the term of this patent is extended or adjusted under 35 U.S.C. 154(b) by 645 days.

(21) Appl. No.: 10/761,795

(22) Filed: Jan. 21, 2004

(65) Prior Publication Data

US 2006/0133252 A1    Jun. 22, 2006

(30) Foreign Application Priority Data

Jan. 21, 2003 (EP) ................... 03001166
Nov. 6, 2003  (EP) ................... 033002200

(51) Int. Cl.
*G11B 7/00* (2006.01)
(52) U.S. Cl. ............. 369/124.15; 369/124.01; 369/44.34
(58) Field of Classification Search ................ None
See application file for complete search history.

(56) References Cited

U.S. PATENT DOCUMENTS 6,198,587 B1   3/2001   Hayashi ............ 360/65

FOREIGN PATENT DOCUMENTS

WO       00/22620       4/2000

OTHER PUBLICATIONS

25 GB Read-Only Disk System Using The Two-Dimensional Equalizer Yoshimi Tomita et al. Jpn. J. Appl. Phys. vol. 40 (2001) pp. 1716-1722.
New Equalizer To Improve Signal-to-Noise Ration Shogo Mianba et al. Jpn. J. Appl. Phys. vol. 38 (1999) pp. 1715-1719.
Signal Processing For 15/27 GB Read-Only Disk System Fumihiko Yokogawa et al. Jpn J. Apply. Phys. vol. 39 (2000) pp. 819-823.

*Primary Examiner*—Muhammad Edun
(74) *Attorney, Agent, or Firm*—Joseph J. Laks; Harvey D. Fried; Francis A. Davenport

(57) ABSTRACT

The invention relates to an electronic circuit for decoding a read signal from an optical storage medium, the electronic circuit comprising a limit equalizer for amplification of high frequency read signal components without substantially increasing inter-symbol interference, a Viterbi detector being coupled to an output of the limit equalizer for providing the decoded read signal, a coefficient adaptation circuit for tuning the limit equalizer to a partial response target.

10 Claims, 7 Drawing Sheets

Look-up Table

| NRZ C B A | Half Amplitude Detected |
|---|---|
| 0 0 0 | 0 |
| 0 0 1 | 1 |
| 0 1 0 | 1 |
| 0 1 1 | 0 |
| 1 0 0 | 0 |
| 1 0 1 | 1 |
| 1 1 0 | 0 |
| 1 1 1 | 0 |

ELECTRONIC CIRCUIT FOR DECODING A READ SIGNAL FROM AN OPTICAL STORAGE MEDIUM

FIELD OF THE INVENTION

The present invention relates to the field of reading and decoding of optical storage media, and more particularly to

BACKGROUND OF THE INVENTION

There's a variety of optical storage media with different data capacities, such as CDs and DVDs. In order to increase the capacity of a disc with a certain fixed diameter, the track pitch and the channel bit length have to be reduced, which requires a reduction of the laser spot size, i.e. a reduction of the used laser wave length. Currently, disc recording systems are under development which use blue laser diodes with a wave length of 405 nm.

For example, there is an emerging standard for a high capacity optical disc recording format which utilises blue-violet laser light and which is called 'blu-ray disc', or "BD" disc. A copy of the blue-ray disc standard can be obtained from Royal Phillips Electronics, Intellectual Property and Standards, Eindhoven, The Netherlands.

In order to increase the storage density further, the channel bit length is reduced to a higher degree than the gain in spot size reduction due to the shorter wave length, i.e. the ratio between the spot size and the channel bit length, which is known as the "information density", is increasing.

In fact, the optical channel behaves like a lowpass filter and the transfer function is known as the "modulation transfer function", or shortly MTF, in the literature.

For high data storage densities on optical discs, the modulation transfer function drops very steeply, i.e. the high frequency components of the analog read signal are attenuated considerably compared to the low frequency components. For example for a BD disc with a storage capacity of 25 GBytes, the shortest run-length components (2T) are attenuated by a factor of more than 20 dB compared to the longest run-lengths of 8T. This results in a large amount of inter-symbol interference (ISI), which is the reason that the eye-pattern, i.e. the HF signal obtained by summing the currents of the four elements of the photo detector ("Read channel 1, RDCH1"), is nearly closed, even without noise.

In order to recover the user data stored on a high density optical disc, a Partial-Response Maximum-Likelihood (PRML) detection scheme is typically used. In a standard Partial-Response Maximum-Likelihood (PRML) detection system, a FIR filter with for example 7 taps is used for the equalization of the incoming signal to the selected partial-response target. If the equalization is made adaptively in order to further improve the data detection reliability, for example with a hardware implementation of the LMS (least-mean-square) algorithm, a relatively high implementation effort is necessary.

On the other hand, the re-shaping of the incoming waveform to a simple partial-response target like PR(1, 2, 1) with a memory length of 2 delivers only non-optimum results, since the modulation transfer function (MTF) for a high-density optical disc is too different compared to PR(1, 2, 1), requiring a high gain boost of the higher frequency components of the signal. This has the drawback that the noise is also attenuated considerably.

The other possibility is to use a more complicated partial-response target with a memory length of 3, i.e. PR(1, 2, 2, 1), or even more. This has the advantage that the partial-response target frequency response is much more similar to the MTF of the optical channel and hence only a moderate amplification of the high frequency signal components is necessary. But the serious drawback is the high implementation effort needed (chip area) and that high processing speeds could not been achieved due to the complicated Viterbi detector.

For the jitter measurement, the blu-ray disc standard (BD) defines in its Annex 12.8 the so-called limit equalizer.

A limit equalizer is a non-linear equalizer which can boost the high frequency components without increasing the inter-symbol interference. Such an equalizer can improve the quality of the HF signal fed into the slicer and also reduces the jitter. Such limit equalizers are also known from:

(1) F. Yokogawa, S. Miyanabe, M. Ogasawara, H. Kuribayashi, Y. Tomita and K Yamamoto; Jpn. J. Appl. Phys. 30 (2000) 819, (2) S. Miyanabe, H. Kuribayashi and K. Yamamoto; Jpn J. Appl. Phys. 38 (1999) 1715, (3) Yshimi Tomita, Hiroshi Nishiwaki, Shogo Miyanabe, Hiroki Kuribayashi, Kaoru Yamamoto and Fumihiko Yokogawa; Jpn J Apl. Phys Vol 40 (000) pp. 1716-1722, Part 1, No. 3B, March 2001.

For example, a limit equalizer has a first stage with a conventional linear equalizer in order to reduce inter-symbol interference and boost the high frequency signal components. The limit equalisation is done after the linear equalisation. Before limiting the signal, the sampled data are interpolated. The configuration of the limit equalizer is almost the same as that of the FIR filter-type linear equalizer but the limiter limits the reproduced signal level except for the centre tap signal. The FIR filter acts as a high boost equalizer and its gain depends on the choice of a high boost coefficient. If the high boost coefficient becomes large then the gain of the FIR filter is high.

SUMMARY OF THE INVENTION

It is therefore an object of the present invention to provide for an improved electronic circuit and electronic device for reading of optical storage media, in particular for blu-ray discs, as well as a corresponding method and computer program product.

The present invention provides for an electronic circuit for decoding a read signal from a high density optical storage medium, such as a blu-ray disc (BD), where a limit equalizer is used as a partial-response equalizer for a succeeding Viterbi detector. This way highly reliable data detection can be achieved at a moderate hardware effort. In particular, a simpler partial response target and a simpler Viterbi detector can be used due to the combination of the limit equalizer and partial-response maximum-likelihood (PRML) detection.

In accordance with a further preferred embodiment of the invention, the high boost coefficient of the limit equalizer is adjustable and is controlled based on the outputs of the Viterbi detector, the envelope of the equalized read signal and timing information derived from the equalized read signal.

Further preferred embodiments of the invention are set forth in the dependant claims.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS

Figure 1:
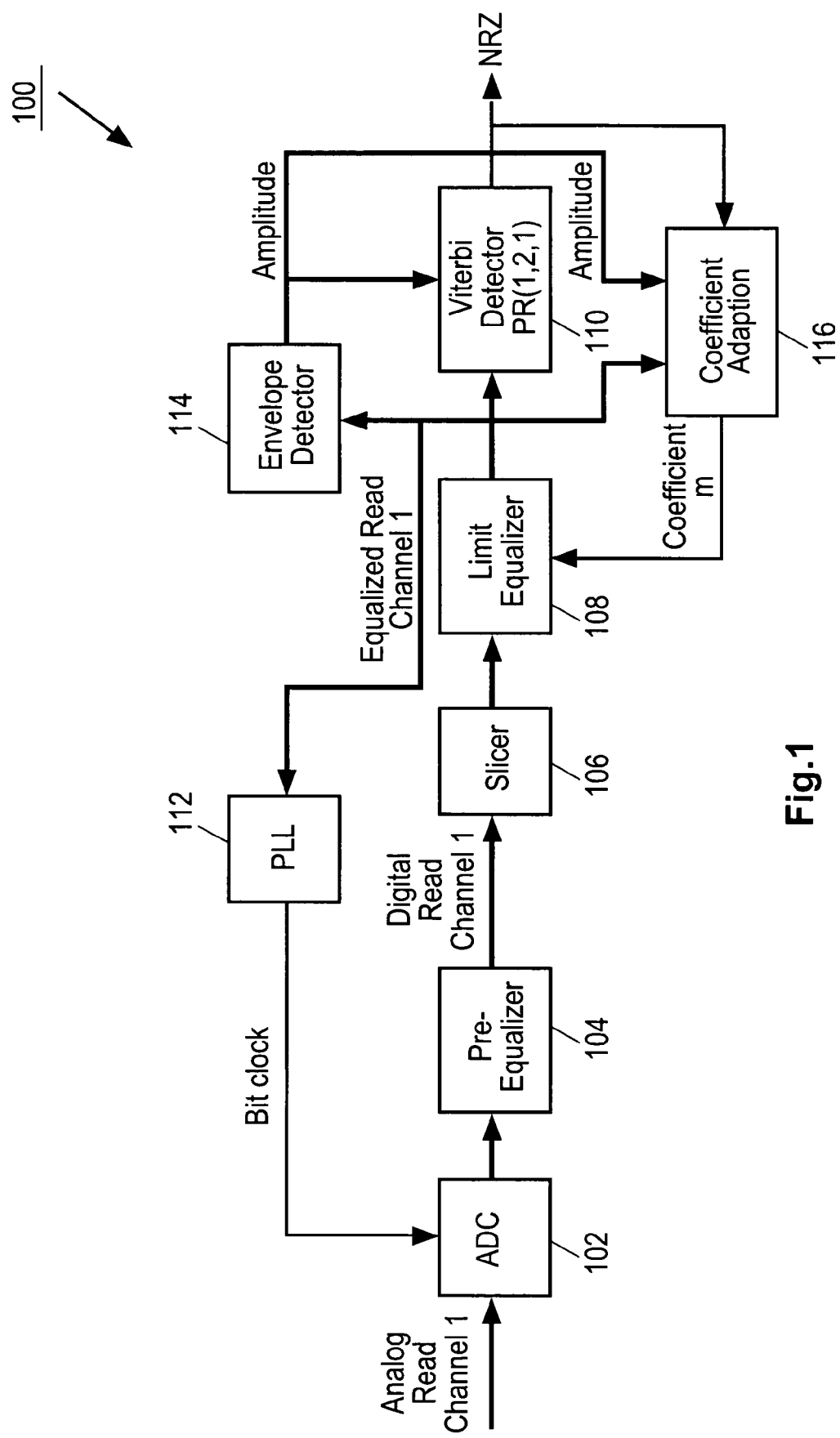
FIG. 1 is a block diagram of an embodiment of an electronic circuit of the invention.

FIG. 1 shows a block diagram of electronic circuit 100 for decoding a read signal obtained from a high density optical disc. The electronic circuit 100 has analogue to digital converter (ADC) 102 for converting the analogue read signal to a digital signal. The digital output of ADC 102 is coupled to pre-equalizer 104 which has its output coupled to slicer 106. Slicer 106 serves for defining a reference level and for removing of certain signal asymmetries.

The output of slicer 106 is coupled to limit equalizer 108. Limit equalizer 108 has a high boost coefficient "m" which determines the gain for the amplification of the high frequency read signal components. Limit equalizer 108 is used as a partial-response equalizer with maximum-likelihood detection which is necessary for the succeeding Viterbi detector 110. Viterbi detector 110 outputs the decoded read signal in the NRZ signal format.

Further electronic circuit 100 has phase locked loop (PLL) 112 for providing a bit clock signal. Envelope detector 114 and coefficient adaptation module 116 form a control system for adapting the high boost coefficient "m" of the limit equalizer 108 as it will be explained in more detail in the following.

Figure 2:
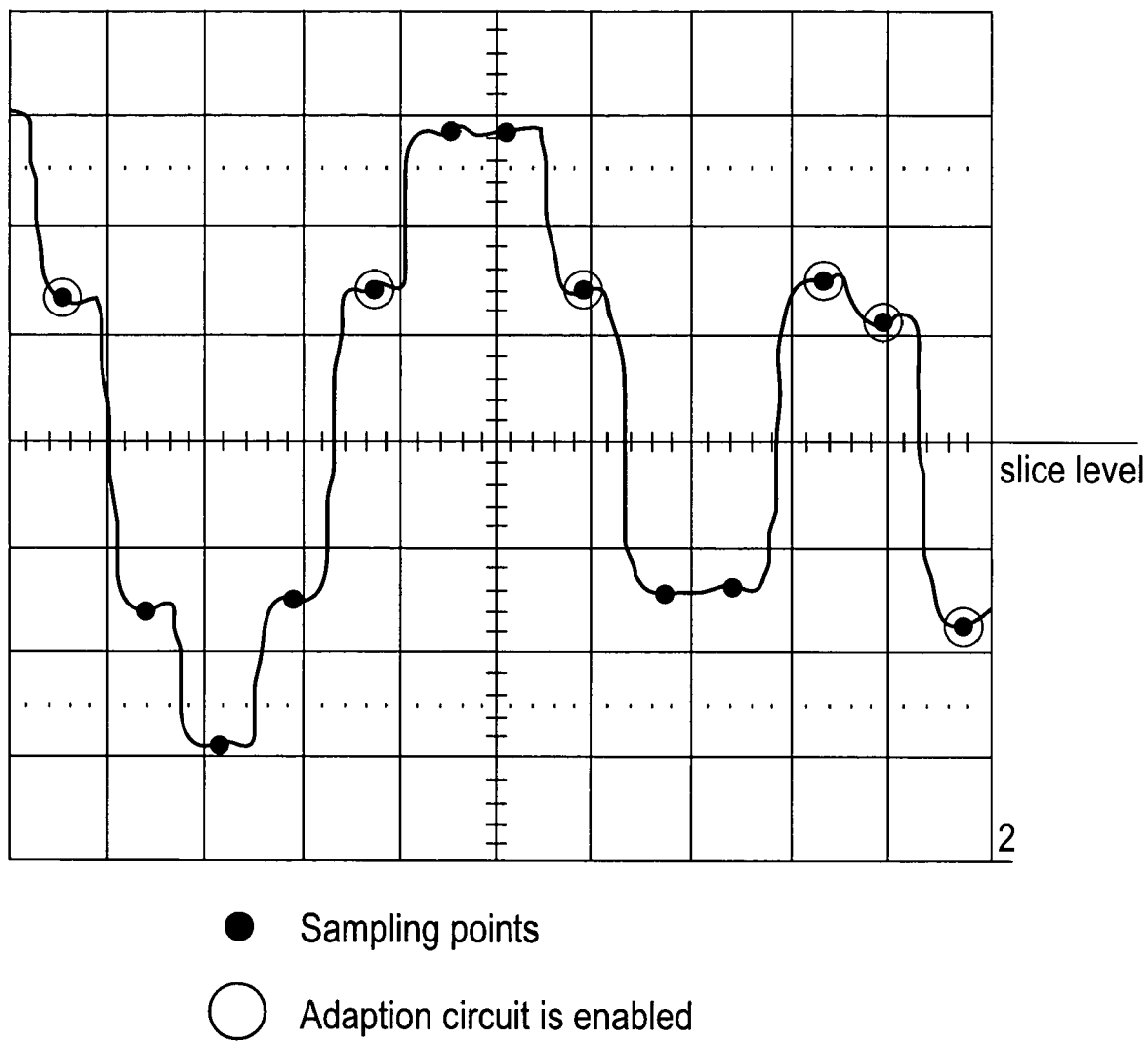
FIG. 2 shows the wave form at the output of the limit equalizer.

In contrast to the BD standard, the analog read channel 1 eye-pattern is not sampled in the middle of the channel bit position but at the zero-cross position, which results in non-zero samples at the output of the equalizer, which is the input for the PLL. FIG. 2 shows the waveform at the output of the limit equalizer.

This phase shift could be achieved either by an adequate PLL circuit, an additional FIR-Filter with an even number of coefficients (e.g. 2 coefficients 0.5+0.5D) between the limit equalizer and the PLL, or any other conceivable means.

Figure 3:
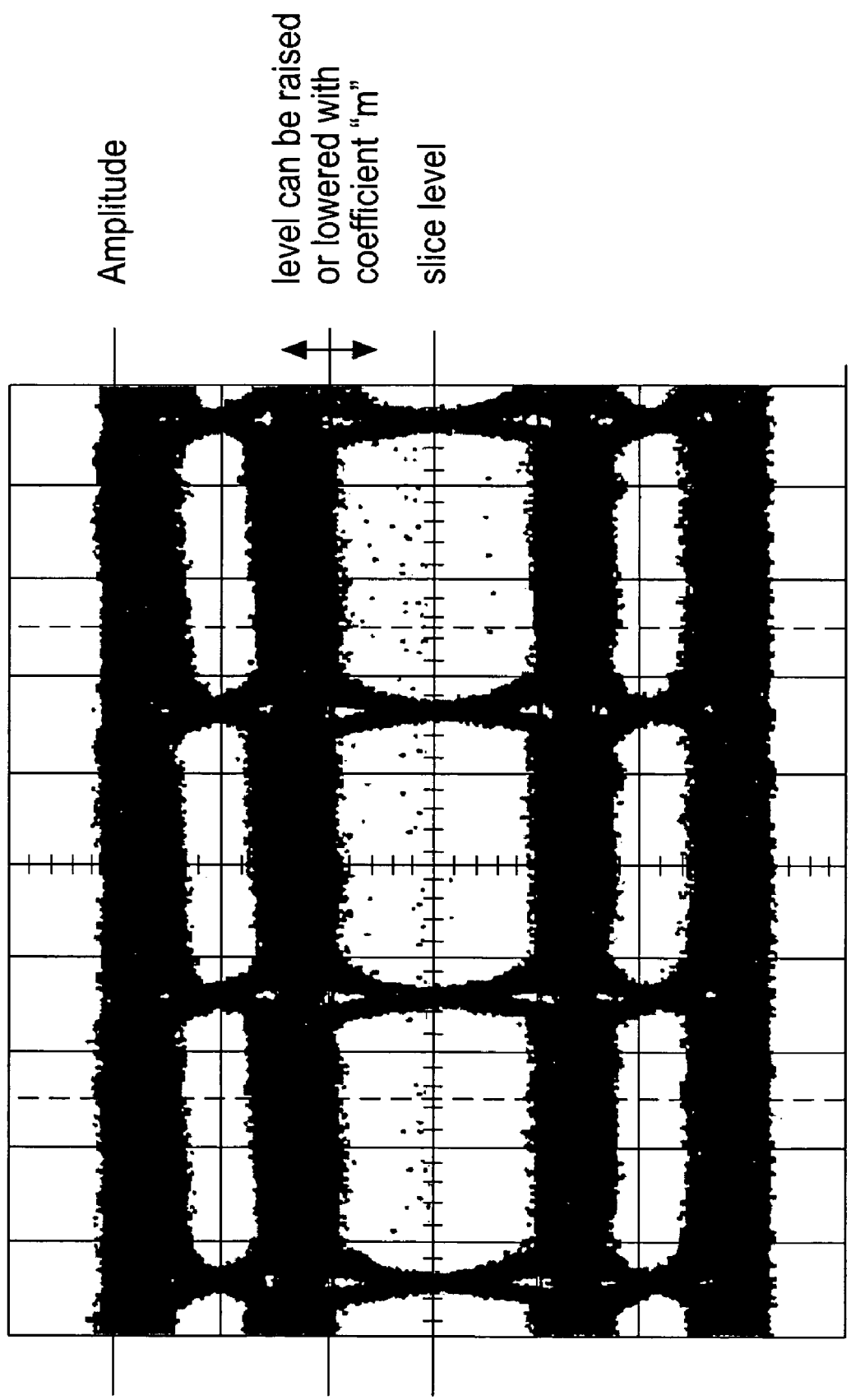
FIG. 3 shows the output of the limit equalizer measured with an DSO in persistence mode.

FIG. 3 shows the output of the equalizer measured with a DSO in persistence mode. By modification of the high-boost coefficient "m", the smaller signal levels of the equalizer output signal can be raised or lowered.

Figure 4:
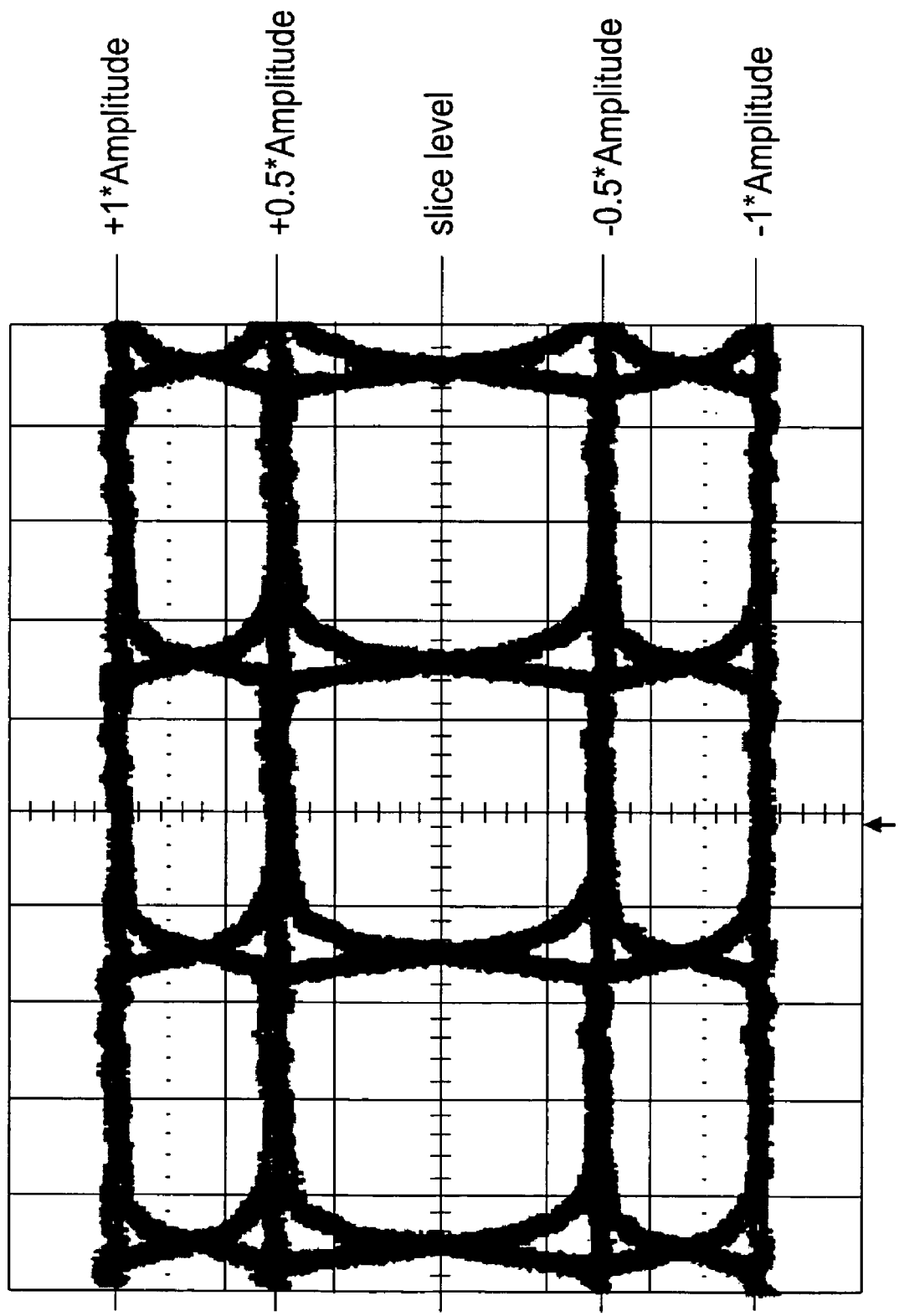
FIG. 4 shows the target waveform for the partial-response target PR(1, 2, 1)

FIG. 4 shows the target waveform for the partial-response PR(1, 2, 1). This is how the input signal for the Viterbi detector should look like. It has four distinct signal levels: maximum amplitude (+1), half amplitude (+0.5), negative half amplitude (−0.5) and negative maximum amplitude (−1). The amplitude signal for the coefficient adaptation is derived with an envelope detector. This amplitude signal is also used as the reference level for the branch metric calculation inside the Viterbi detector, i.e. the branch metric calculation follows gain variations of the incoming signal.

Figure 5:
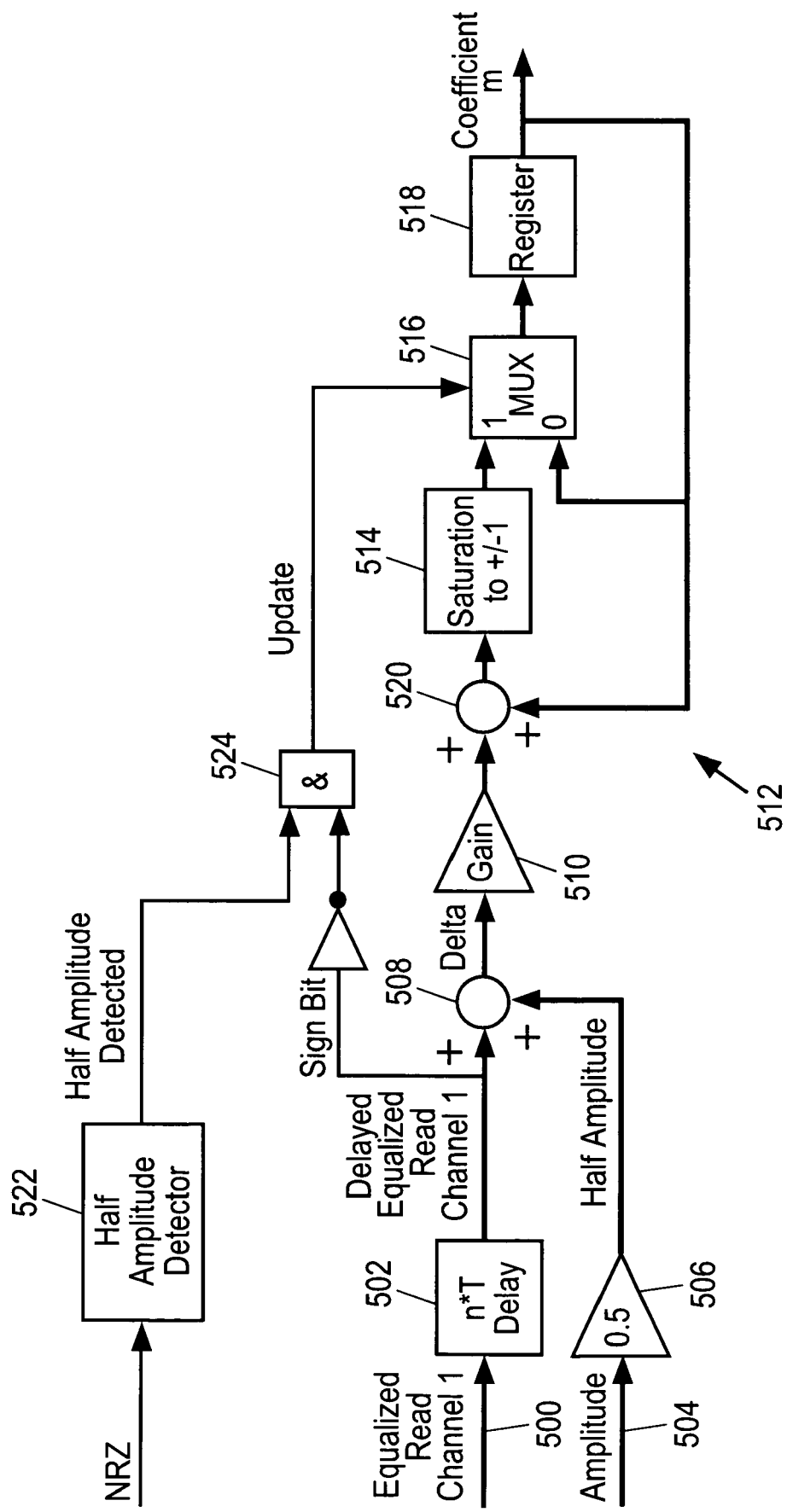
FIG. 5 shows a more detailed block diagram of the coefficient adaptation circuit module of FIG. 1.

By tuning of the high-boost coefficient "m" of the limit equalizer, a close merging of the two waveforms can be achieved. This is the task of the block coefficient adaptation module 116 in FIG. 1, which is shown in detail in FIG. 5:

The coefficient adaptation module has an input 500 for inputting of equalized read channel 1 which is the output of limit equalizer 108 (cf. FIG. 1). The equalized read channel 1 signal is delayed to take the corresponding delay of Viterbi detector 110 into account. This is done by means of delay block 502 which provides a delay of "n×T" which is the same delay as the delay of Viterbi detector 110.

Further the amplitude of the equalized read channel one signal is applied at input 504. The amplitude signal is provided by envelope detector 114 (cf. FIG. 1). The amplitude is divided by two by means of amplifier 506 to provide the half amplitude signal level. The delayed equalized read channel one and the half amplitude signal level are subtracted by means of subtractor 508 to provide the deviation signal "delta".

By means of the gain factor 510 the signal "delta" is attenuated, for example by some powers of 2. This could be achieved by right-shifting the signal or feeding it to the less significant bits of the adder 520. The amplified "delta" signal is inputted into an integrator filter 512. The integrator filter 512 has module 514 which serves to limit the range of the resulting high boost coefficient "m" to for example +/−1. Further the integration filter 512 has multiplexer (MUX) 516 which receives the signal "update" as timing information. The output of MUX 516 is coupled to register 518 which stores the actual high boost coefficient value "m". The output of register 518 is fed back to adder 520. Adder 520 adds the amplified delta signal and the high boost coefficient value "m". The result of the addition is inputted into module 514.

Further there is half amplitude detector 522 which serves to detect points of time when the equalized read channel 1 signal is at +0.5 amplitude level. This detection is performed based on the NRZ format signal outputted by Viterbi detector 110 (cf. FIG. 1).

Half amplitude detector 522 provides the signal "half amplitude detected" which is inputted into AND gate 524 as well as the sign bit of the delayed equalizer read channel 1 signal. This way AND gate 524 provides the signal "update" which is at logical "1" when the equalized read channel 1 signal is at the half amplitude signal level. At these points of time the integrator filter 512 becomes operative and the high boost coefficient value "m" is updated in register 518.

The NRZ output data stream from the Viterbi detector is used to find the position where a half amplitude level should be. The half amplitude detector 522 delivers a "1" for each detected intermediate level according to partial-response PR(1, 2, 1). The equalized read channel 1 signal is delayed for an appropriate number of bit clocks, i.e. that it coincides with the position signal "Half amplitude detected". The "Update" signal is derived by adding the inverted sign bit, such that the adaptation circuit is only enabled for reference levels of +0.5 (circles in FIG. 2). The difference between the delayed equalized read channel 1 signal and the half amplitude is multiplied with a gain factor of for example $2^{\wedge}(-8)$ and added to the old coefficient value in order to form the new coefficient value whenever the update signal is high. Otherwise the register value is left unchanged.

Figure 6:
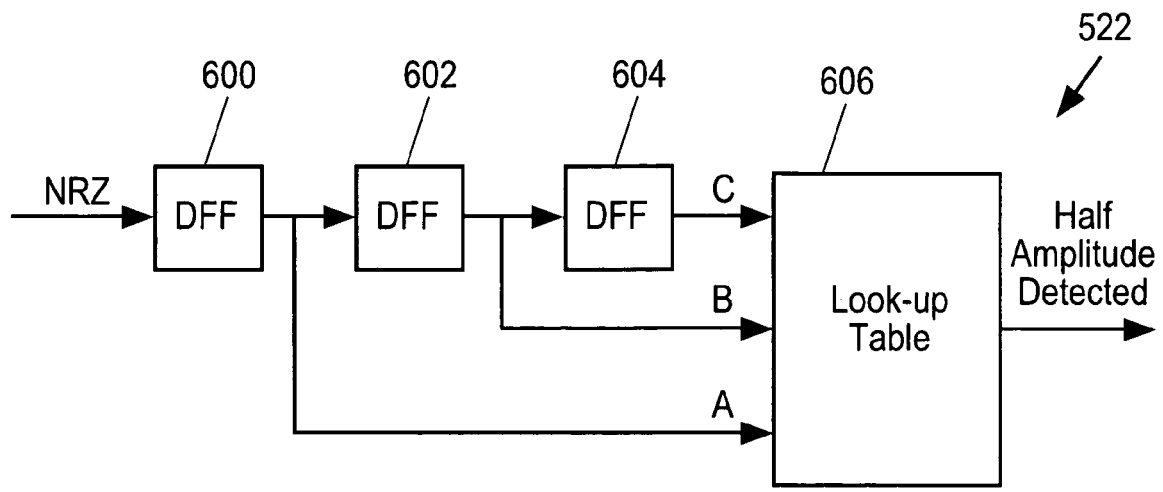
FIG. 6 illustrates the timing detection for the half amplitude signal level.

The half amplitude detector 522 is explained in more detail in FIG. 6.

Half amplitude detector 522 has a chain of shift registers comprising D-Flip-Flops 600, 602 and 604. The NRZ-format signal provided by Viterbi detector 110 (cf. FIG. 1) is applied to the input of D-Flip-Flop 600. The output of D-Flip-Flop is denoted A, output of D-Flip-Flop 602 is denoted B and output of D-Flip-Flop 604 is denoted C. The outputs A, B, and C are inputted into module 606 which implements look-up table 608.

Module 606 outputs the signal "half amplitude detected" which is at logical "1" when the equalizer read channel one signal is at half amplitude level. For example if A=0, B=0 and C=0 the "half amplitude detected" signal is also logical "0" and if A=1, B=0 and C=0 the "half amplitude detected" signal is at logical "1".

Figure 7:
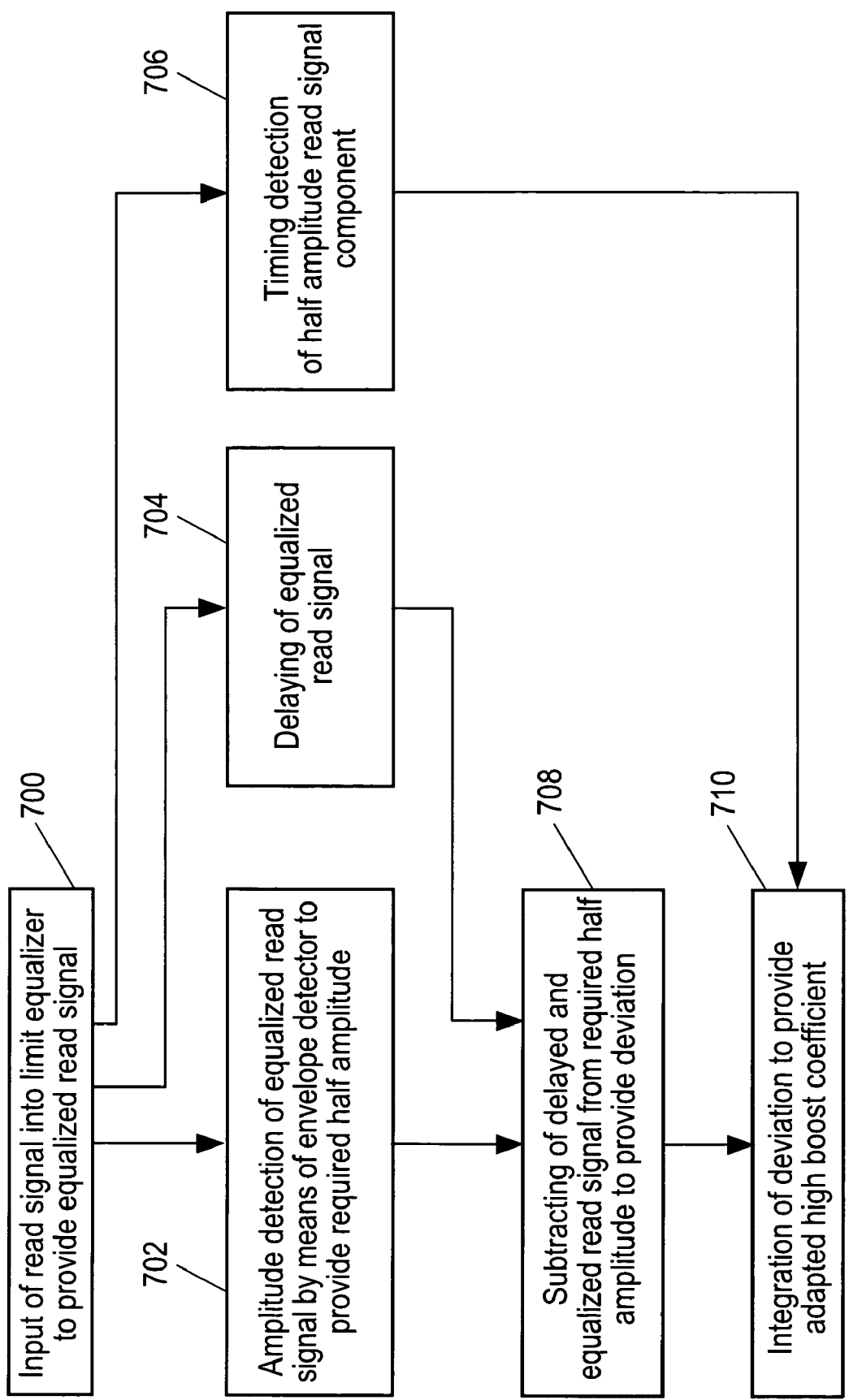
FIG. 7 is illustrative of a flow chart of a method of the present invention.

FIG. 7 is illustrative of a corresponding flow chart. In step 700 the digital read signal obtained from the optical disk is inputted into a limit equalizer to provide an equalized read signal. In step 702 the required half amplitude level of the equalized read signal is determined by detecting the amplitude of the equalized read signal by means of an envelope detector (cf. envelope detector 114 of FIG. 1). In step 704 the equalized read signal of step 700 is delayed by the delay of the Viterbi detector coupled to the limit equalizer (cf. Viterbi detector 110 of FIG. 1). The required half amplitude signal level and the delayed equalized read signals are subtracted in step 708 to provide a deviation signal. In step 706 the point of time when the equalized read signal has its half amplitude signal level are detected. At these points of time, an integration of the deviation obtained in step 708 is performed in step 710 in order to provide an adapted high boost coefficient "m".

What is claimed is:

1. An electronic circuit for decoding a read signal from an optical storage medium, the electronic circuit comprising:
    a limit equalizer providing an equalized read signal having an amplitude signal level and an intermediate signal level,
    means for determining a required intermediate signal level based on a detected amplitude level,
    means for detecting an actual intermediate signal level of the equalized read signal,
    control means for adapting the high boost coefficient of the limit equalizer based on a comparison of the required intermediate signal level and the actual equalized read signal; and,
    a Viterbi detector coupled to an output of the limit equalizer provides the decoded read signal.

2. The electronic circuit according to claim 1, wherein the limit equalizer having an adjustable high boost coefficient for amplification of the high frequency read signal components and means for adapting the high boost coefficient based on the decoded read signal provided by the Viterbi detector and the equalized read signal provided by the limit equalizer.

3. The electronic circuit according to claim 1, wherein the means for determining the required intermediate signal level comprising an envelope detector for detecting the actual amplitude.

4. The electronic circuit according to claim 1, wherein the control means comprising an integrator for integration of a deviation between the required intermediate signal level and the actual equalized read signal provided by the limit equalizer.

5. The electronic circuit according to claim 1, wherein the optical storage medium being a blu-ray disc.

6. An electronic device for reading an optical storage medium, the electronic device comprising:
    means for providing a read signal from the optical storage medium, a limit equalizer providing an equalized read signal having an amplitude signal level and an intermediate signal level,
    means for determining required intermediate signal level based on a detected amplitude level,
    means for detecting an actual intermediate signal level of the equalized read signal,
    control means for adapting the high boost coefficient of the limit equalizer based on a comparison of the required intermediate signal level and the actual equalized read signal; and,
    a Viterbi detector coupled to an output of the limit equalizer for providing the decoded read signal.

7. A method for reading an optical storage medium to provide a decoded signal, the method comprising:
    reading a signal from the optical storage medium,
    equalising the signal to have an amplitude level and an intermediate signal level,
    determining a required intermediate signal level based on a detection of the amplitude level,
    determining an actual intermediate signal level of the equalized signal,
    determining a deviation signal based on the actual intermediate signal level and the required intermediate signal level to provide an adapted high boost co-efficient for equalising the signal; and
    performing a Viterbi detection on the equalized read signal to provide the decoded signal.

8. The method according to claim 7 further comprising adapting a high boost co-efficient for amplification of the high frequency read signal components based on the decoded signal and the equalized signal.

9. The method according to claim 7 further comprising integrating the deviation signal to provide the adapted high boost co-efficient.

10. Computer readable medium having code to execute decoding of a read signal from an optical storage medium in an electronic device comprising:
    equalising the read signal to have an amplitude level and an intermediate signal level,
    determining required intermediate signal level based on a detection of the amplitude level,
    determining an actual intermediate signal level of the equalized read signal,
    determining deviation signal based on, the actual intermediate signal level and the required intermediate signal level to provide an adapted high boost co-efficient for egualising the read signal; and,
    performing a Viterbi detection on the equalized read signal to provide the decoded read signal in the electronic device.

* * * * *

UNITED STATES PATENT AND TRADEMARK OFFICE
CERTIFICATE OF CORRECTION

| | |
|---|---|
| PATENT NO. | : 7,221,638 B2 |
| APPLICATION NO. | : 10/761795 |
| DATED | : May 22, 2007 |
| INVENTOR(S) | : Stefan Rapp |

It is certified that error appears in the above-identified patent and that said Letters Patent is hereby corrected as shown below:

Column 6, line 53, please delete "egualising" and insert therefor --equalising--.

Signed and Sealed this

Seventh Day of August, 2007

JON W. DUDAS
*Director of the United States Patent and Trademark Office*